(12) United States Patent  (10) Patent No.: US 7,721,825 B2
Gobright, IV et al.  (45) Date of Patent: May 25, 2010

(54) PORTABLE CONCRETE BORING MACHINE

(75) Inventors: Francis M. Gobright, IV, Howell, MI (US); Francis M. Gobright, V, Howell, MI (US)

(73) Assignee: Diamond Products, Limited, Elyria, OH (US)

( * ) Notice: Subject to any disclaimer, the term of this patent is extended or adjusted under 35 U.S.C. 154(b) by 34 days.

(21) Appl. No.: 12/093,162

(22) PCT Filed: Jan. 18, 2008

(86) PCT No.: PCT/US2008/051396

§ 371 (c)(1),
(2), (4) Date: May 9, 2008

(87) PCT Pub. No.: WO2008/089384

PCT Pub. Date: Jul. 24, 2008

(65) Prior Publication Data

US 2009/0044983 A1   Feb. 19, 2009

Related U.S. Application Data

(60) Provisional application No. 60/881,122, filed on Jan. 18, 2007.

(51) Int. Cl.
*E21B 7/02* (2006.01)
(52) U.S. Cl. .............................. 175/57; 175/203; 125/35
(58) Field of Classification Search ............... 172/20, 172/57, 203; 125/35, 36; 175/20, 57, 203
See application file for complete search history.

(56) References Cited

U.S. PATENT DOCUMENTS

| | | | |
|---|---|---|---|
| 1,915,986 A | 6/1933 | Ferris | |
| 3,220,494 A | 11/1965 | Cannon et al. | |
| 3,454,114 A | 7/1969 | Poage | |
| 3,568,779 A | 3/1971 | Cannon | |
| 3,570,606 A | 3/1971 | Guritz | |
| 3,982,521 A | 9/1976 | Bieri | |
| 4,013,133 A | 3/1977 | Bieri | |
| 4,315,552 A | 2/1982 | Winsor | |
| 4,442,904 A | 4/1984 | Wibom | |
| 4,797,025 A | 1/1989 | Kennedy | |

(Continued)

FOREIGN PATENT DOCUMENTS

EP   0485630 A1   5/1992

OTHER PUBLICATIONS

Diamond Products Drill Rig—Jan. 1, 2000 (2 pages).

*Primary Examiner*—William P Neuder
(74) *Attorney, Agent, or Firm*—Rankin, Hill & Clark LLP

(57) ABSTRACT

A portable boring machine for cutting holes in a cutting surface is provided. The portable boring machine includes a vacuum system to secure a front end of the portable boring machine to a cutting surface, a hydraulic boring sub-assembly, which includes a hole saw to cut holes in the cutting surface, a water cooling/lubrication system to provide cooling and/or lubrication to the hole saw during the cutting process, and a control system to control the operation of the portable boring machine. The portable boring machine also includes multiple power-driven wheels. The wheels are attached to a bottom portion of a frame and are powered by an engine, which is mounted within the frame.

20 Claims, 3 Drawing Sheets

U.S. PATENT DOCUMENTS

| | | |
|---|---|---|
| 5,184,429 A | 2/1993 | Parsons |
| 5,445,437 A * | 8/1995 | Adamson .................... 299/39.3 |
| 5,470,131 A | 11/1995 | Nolan et al. |
| 5,570,975 A | 11/1996 | Reinert, Sr. |
| 5,762,148 A | 6/1998 | Kattentidt et al. |
| 5,794,724 A * | 8/1998 | Moller ........................ 175/170 |
| 5,823,276 A | 10/1998 | Beck, III |
| 5,944,452 A | 8/1999 | Reinert, Sr. |
| 5,954,143 A | 9/1999 | McCabe et al. |
| 6,186,248 B1 | 2/2001 | Silay et al. |
| 6,308,787 B1 | 10/2001 | Alft |
| 6,464,020 B1 * | 10/2002 | Wills ............................ 175/20 |
| 6,543,126 B1 * | 4/2003 | Hamlin ......................... 29/822 |
| 6,907,874 B1 * | 6/2005 | Faircloth ................. 125/13.01 |
| 7,070,366 B2 | 7/2006 | Reichenberger et al. |
| 7,093,679 B1 | 8/2006 | Watson |
| 2003/0111266 A1 * | 6/2003 | Roach .......................... 175/57 |
| 2004/0112613 A1 * | 6/2004 | McGivery .................... 172/25 |
| 2004/0247407 A1 * | 12/2004 | Tillemans et al. ........... 409/137 |

* cited by examiner

PORTABLE CONCRETE BORING MACHINE

This application claims priority to U.S. Provisional Application Ser. No. 60/881,122 filed Jan. 18, 2007 which is incorporated herein by reference in its entirety.

BACKGROUND OF THE INVENTION

1. Field of the Invention

The present invention relates to a concrete drill and more specifically, to a portable concrete boring machine having a hole saw to cut circular holes in concrete.

2. Description of Related Art

When cutting circular holes in a concrete surface it is very important that the machine supporting the hole saw be stable and secure during the cutting process. Conventional concrete boring or core drilling machines are typically bolted to the concrete surface to stabilize the machine during the cutting process. One disadvantage to the conventional boring machine is that it is very time consuming to bolt and unbolt the machine to and from the concrete surface. Another disadvantage is that conventional boring machines are not portable. In other words, conventional boring machines require a separate external source to move the machine from location to location, which again is very time consuming. Further, if there are space restrictions at the cutting location it may be difficult if not impossible to maneuver the cutting machine along with the external transporting source into the cutting location.

There have been several attempts to overcome the above mentioned disadvantages. One, for example, is the concrete hole cutting machine disclosed in U.S. Pat. No. 6,907,874 to Faircloth. Faircloth discloses a hole cutting machine that is adapted to be connected to a front end loader. The front end loader transports the cutting machine from location to location. Faircloth, however, still requires an external source (e.g. a front end loader) to transport the cutting machine from location to location and therefore, does not solve the issue of portability.

Another attempt to address the above mentioned disadvantages is disclosed in U.S. Pat. Pub. No. 2004/0112613 to McGivery. McGivery discloses a core cutting machine mounted to a back end of a truck. The truck is provided to provide stability to the core cutting machine during the cutting process. The truck, however, is still an external source with a separate core cutting machine mounted to the truck bed. Further, McGivery does not lend itself to portability because the truck is rather large and is not adequate to maneuver in restricted spaces. Therefore, McGivery does not solve the issue of portability.

Thus, what is required is a portable boring machine that is easily transported from location to location and can be easily maneuvered by an operator without the need of an external source such as a front end loader, a truck, etc.

SUMMARY OF THE INVENTION

In accordance with one aspect, the present invention overcomes the above mentioned disadvantages by providing portable boring machine for cutting holes in a cutting surface that includes multiple power driven wheels for easy maneuverability. The portable boring machine also includes a frame with a pair of handles horizontally spaced apart and vertically extending outward from an upper-rear portion of the frame, a vacuum system to secure a front end of the portable machine to the cutting surface, a hydraulic boring sub-assembly operatively attached to the front end of the frame, whereby the hydraulic boring system has a boring head, and a hole saw operatively attached to the boring head via a rotary drive shaft, a water cooling/lubrication system to provide cooling and/or lubrication to the hole saw, and an engine mounted within the frame to power to the multiple power driven wheels. To transport the portable boring machine to different cutting locations the operator activates the engine with a drive actuator located on an upper-rear portion of the frame between the handles. The operator then grasps the handles and walks behind the portable boring machine to transport the portable boring machine.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
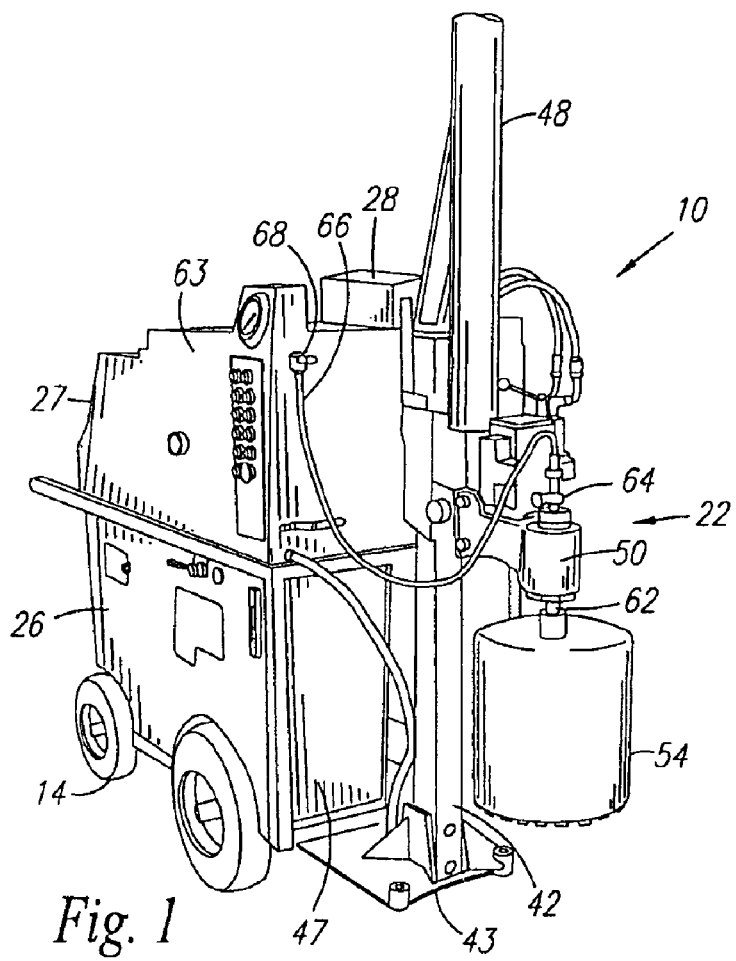
FIG. 1 is a perspective front view of a first embodiment of a concrete boring machine in accordance with the present invention
Figure 2:
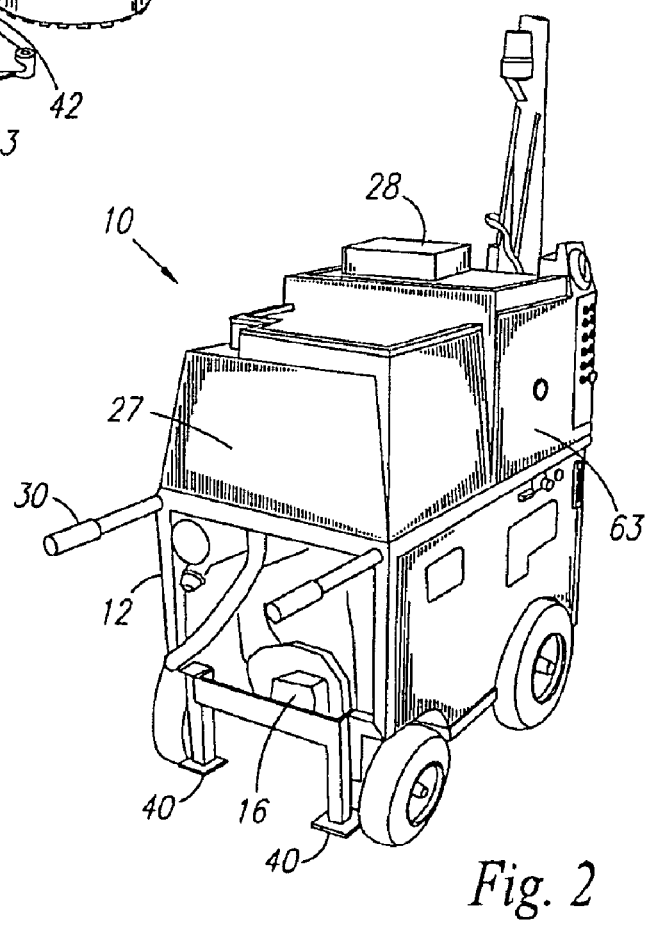
FIG. 2 is a perspective rear view of the rear of the concrete boring machine shown in FIG. 1.

Referring now to the drawings, FIGS. 1 and 2 show a front and rear perspective view respectively of a portable-concrete boring machine 10 (hereinafter "boring machine") in accordance with the present invention. The boring machine 10 includes a rectangular shaped frame 12, power driven wheels 14 attached to the bottom of the frame 12, an internal combustion engine 16, a generator 18, a vacuum system, a hydraulic boring sub-assembly 22, a water cooling/lubrication system, and a control system.

The frame 12 is rectangular in shape and provides a mounting space for both the engine 16 and the generator 18. A panel 26 is attached to each side and to the rear of the frame 12 (a hydraulic tank is mounted in a front portion of the frame 12 and serves to enclose the front portion of the frame 12). A fuel tank 27 is mounted to a rear-top of the frame 12.

Figure 3:
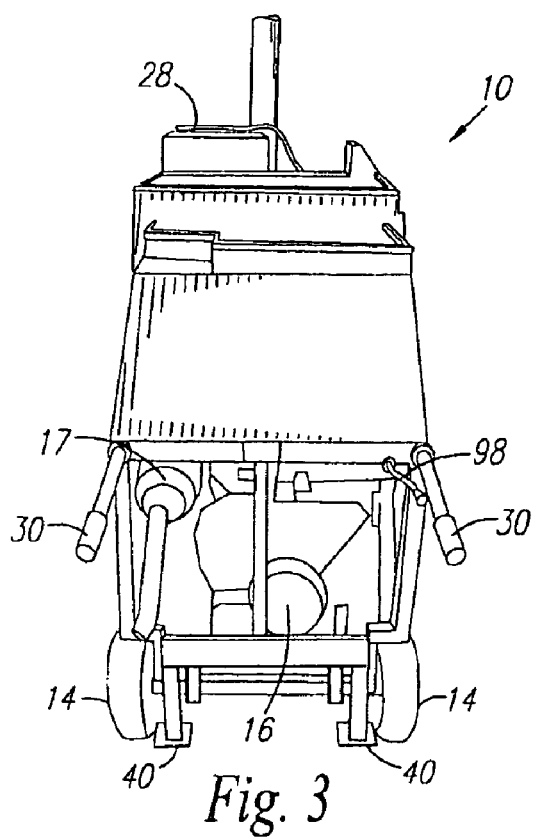
FIG. 3 is a rear view of the concrete boring machine

Referring to FIGS. 2 and 3, a pair of handles 30 extend vertically in a rearward direction from an upper portion of the frame 12. The handles 30 are laterally spaced on either side of a rear portion of the frame 12 and are generally parallel to one another. The handles 30 are used to maneuver the boring machine 10 to a desired location.

Figure 4:
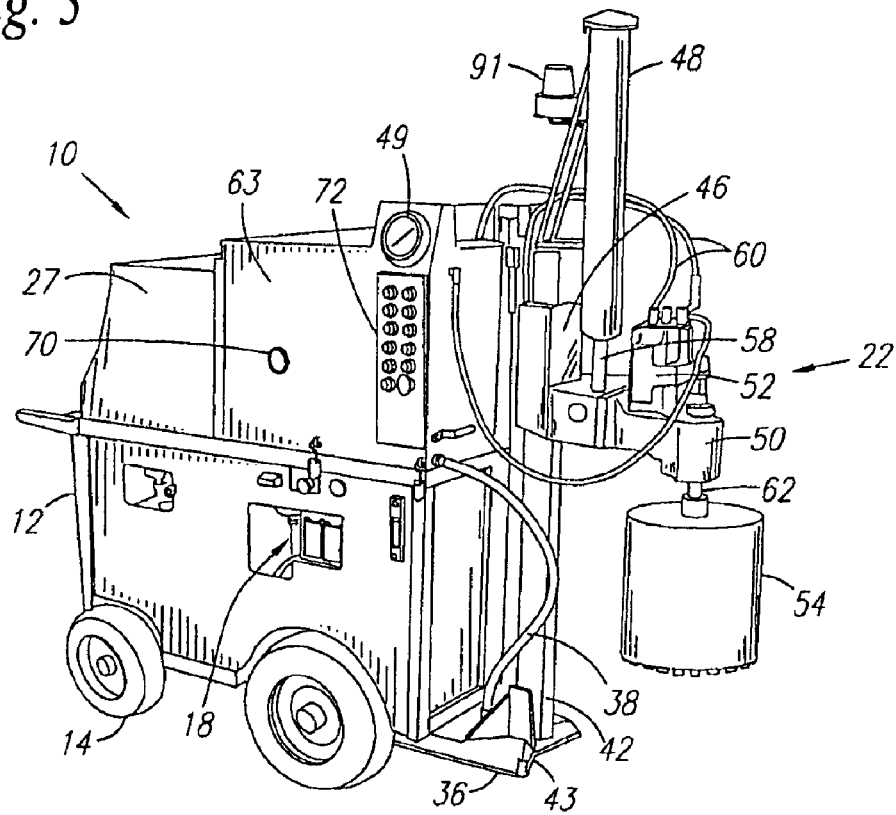
FIG. 4 is a perspective side view of the concrete boring machine.

Referring to FIGS. 2-4, the engine 16 and the generator 18 are mounted within the frame 12, and are therefore protected from outside elements by the panels 26 and the hydraulic tank. The engine 16 is located near the rear of the boring machine 10 and it is attached directly via its power output shaft to a hydraulic pump. The hydraulic pump provides power to the wheels 14 to thereby assist the operator in transporting the boring machine 10 from location to location.

The hydraulic pump also provides hydraulic power to the hydraulic boring sub-assembly 22, the hydraulic cylinder 48 and the machine's leveling system. The engine 16 preferably comprises a gasoline engine and it may include a catalytic converter 17 to allow operation indoors. The generator 18 is powered by the engine 16 in a conventional manner using a polychain attached to a pulley or sheave mounted on the power output shaft of the engine 16. The generator 18 is located near the front of the boring machine and it is used to electrically power the vacuum pump 28 and multiple electrical outlets 34, which may include 110v and/or 220v outlets (see FIG. 6). The electrical outlets 34 may be used to power auxiliary hand tools, such as but not limited to, saws, work lights, a vacuum to pick up slurry, etc. The generator 18 is also used to provide power to the vacuum system, which secures the boring machine 10 in place during operation, as will be described further below.

Referring to FIGS. 1 and 4, the vacuum system includes a vacuum pump 28, a vacuum pad 36, and a vacuum hose 38, which connects the vacuum pump 28 to the vacuum pad 36. As will be explained further below, the vacuum system secures the front end of the boring machine 10 to the ground so as to prevent movement of the boring machine 10 during operation. Once the front end of the boring machine 10 is secured to the cutting surface a pair of leveling feet 40, which are mounted to the rear-bottom of the frame 12, are lowered to level the boring machine, as will be described further below. In one embodiment the frame 22 may be carefully constructed of hollow tubing that is air tight, such that the frame can be used as an accumulator for the vacuum generated by pump 28. Alternatively, a separate vacuum tank could be provided on the machine.

Figure 5:
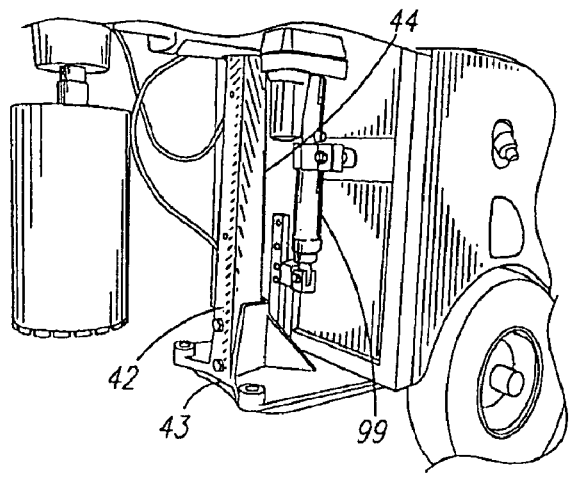
FIG. 5 is a close-up view of a lower front end portion of the concrete boring machine.

Referring to FIGS. 1 and 4, the hydraulic boring sub-assembly 22 includes an elongated support frame 42 having a rectangular cross-section that is slidably secured to the front portion of the boring machine 10 and to a movable support plate 43. An elongated gear track 44 (shown in FIG. 5) extends along one side of the support frame 42 to allow a carriage 46 to travel vertically upward and downward. The carriage 46 may be any type of carriage known in the art, such as but not limited to a roller carriage, a slider carriage, etc. The hydraulic boring sub-assembly 22 further includes a hydraulic tank 47, a hydraulic cylinder 48, a hydraulic gage 49 to measure the hydraulic pressure in the hydraulic circuit, a boring head 50, a variable speed-hydraulic transmission 52, and a core bit or hole saw 54.

The hydraulic tank 47 is located in the front portion of the frame 12 and extends from the bottom of the frame 12 to the top of the frame 12 thereby serving to enclose the front portion of the frame 12. The hydraulic cylinder 48 is attached to a support member 56 that extends upward at an angle from the top of the support frame 42. Thus, the hydraulic cylinder 48 is fixedly secured to the support frame 42. The hydraulic cylinder 48 includes a piston 58 that moves in a vertical direction whereby a distal end of the piston 58 is fixedly attached to the carriage 46. During operation of the boring machine 10 the piston 58, when actuated, moves the carriage 46 vertically along the gear track 44. The boring head 50 is fixedly attached to the carriage 46 and extends outward away from the boring machine 10. Thus, the boring head 50 moves in unison with the carriage 46. The variable speed-hydraulic transmission 52 is attached to a top portion of the boring head 50 and includes two hydraulic hoses 60 that attach the variable speed-hydraulic transmission 52 to the hydraulic pump, which is housed within the frame 12. A rotary drive shaft 62, which is driven by the variable speed-hydraulic transmission 52, extends downward from the boring head 50. The hole saw 54 is removably mounted to a distal end of the rotary drive shaft 62 and rotates with the rotary drive shaft 62. Operation of the hydraulic boring sub-assembly 22 will be described further below.

Still referring to FIGS. 1 and 4, the water cooling/lubrication system includes a water tank 63, a connection valve 64, a water hose 66, and an on/off valve 68. The water tank 63 is mounted to the top of the frame 12 near the front of the boring machine 10. The connection valve 64 is mounted to the top of the boring head 50 in line with the rotary drive shaft 62. The water hose 66 provides a connection from the water tank 63 to the connection valve 64. During operation of the boring machine 10, the operator rotates the on/off valve to the 'ON' position to allow water to flow through the water hose 66, through the connection valve 64, and down to the hole saw 54 via the rotary drive shaft 62. The water provides cooling and lubrication to the hole saw 54 during the cutting operation. A water level gauge 70 is located on a side of the water tank 63 (see FIG. 6) to allow the operator to monitor the water level during operation of the boring machine 10.

Figure 6:
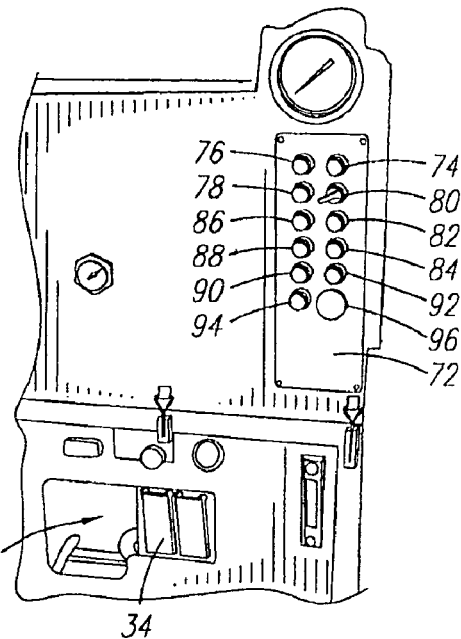
FIG. 6 is a close-up view of the control panel.

Referring to FIGS. 4 and 6, the control system controls the operation of the boring machine 10 and includes a control panel 72, which is located adjacent to the water tank 63. The control system is of the type commonly known in the art and will not be described in further detail. The control panel 72 includes multiple pushbuttons and/or rotary switches to operate the boring machine 10. The pushbuttons and/or rotary switches include a drill up pushbutton 74 to raise the boring head 50, a drill down pushbutton 76 to lower the boring head 50, and a turbo pushbutton 78, which when depressed simultaneously with either the drill up 74 or the drill down 76 pushbutton increases the travel rate of the boring head 50 by approximately ten times than the normal boring head 50 travel rate. The control system also includes an auto down feature, which is actuated by an auto down switch 80. The auto down feature is typically actuated when the hole saw 54 is moving in a downward direction but not until after the hole saw 54 initially contacts a cutting surface to begin the cutting process. Once actuated, the auto down feature automatically sustains the downward direction of the hole saw 54 without the need to manually press additional pushbuttons. The control panel 72 further includes a stand up pushbutton 82 to hydraulically raise the vacuum pad 36, a stand down pushbutton 84 to hydraulically lower the vacuum pad 36, a feet up pushbutton 86 to hydraulically raise the leveling feet 40, a feet down pushbutton 88 to hydraulically lower the leveling feet 40, a light pushbutton 90 to control a strobe light 91 and/or a spot light on the boring machine 10, a water pump pushbutton 92 to control the operation of the water cooling/lubrication system, and a vacuum pump pushbutton 94 to control the operation of the vacuum pump 28. An emergency pushbutton 96 is provided to stop the operation of the boring machine 10 in the event of an emergency. In order to transport the boring machine 10 from one location to another the emergency stop button 96 must be in a pushed in position. A control device in the form of a drive actuator 98 is located in between the handles 30 on an upper-rear portion of the frame 12. The hydraulic drive actuator 98 is used to actuate the engine 16 to thereby provide power to the wheels 14, in a manner commonly known in the art, in order to transport the boring machine 10 to different locations. Once the drive actuator 98 actuates the engine 16, the operator then grasps the handles 30 and maneuvers the portable boring machine 10 to a different cutting location. In addition to a hydraulic driver for wheels 14, it will be appreciated that a electric motor could be provided to drive such wheels 14.

Once the boring machine is positioned in a desired cutting location, the emergency stop pushbutton 96 must be in a pulled out position to allow operation of the boring machine 10. The vacuum system is actuated via the stand down pushbutton 84. At this time the support frame 42 and support plate 43, which are fixedly attached to each other, are actuated via a hydraulic cylinder 99 to slide in a vertical downward direction. The vacuum pad 36, which is mounted to an underside of the support plate 43, is thereby lowered until it contacts the surface of the cutting surface. The vacuum pump pushbutton 94 is depressed to actuate the vacuum pump 28. The vacuum pump 28 draws a vacuum impulse via the vacuum hose 38 to secure the boring machine 10 in place. The vacuum system draws a vacuum using a vacuum impulse rather than drawing a vacuum slowly to ensure that the boring machine 10 is secured to the cutting surface in the event that the cutting surface contains cracks. The feet down pushbutton 88 is depressed to hydraulically lower the leveling feet 40 to level the boring machine 10. Leveling the boring machine 10 such that a longitudinal axis of the hole saw 54 is perpendicular to the cutting surface ensures that the finished hole is vertical. The drill down pushbutton 76 is then depressed, which actuates the piston 58 in the hydraulic cylinder 48 in a downward direction. The piston 58 lowers the boring head 50 and hence the hole saw 54 toward the cutting surface. If necessary, the turbo pushbutton 78 may be depressed simultaneously with the drill down pushbutton 76 to increase the travel rate of the boring head 50, as explained above. Once the hole saw 54 has made contact with the cutting surface the auto down switch 80 is rotated such that the auto down feature is actuated, as explained above. As required, the water system may be activated via the water pushbutton 92 to supply water to the hole saw 54 for the purpose of providing cooling and/or lubrication to the hole saw 54 and cutting surface. Water flow may be provided by gravity, or such flow may be enhanced by the addition of an electric pump.

During the cutting process the piston 58 continues to move the boring head 50 and hence the hole saw 54 in a downward direction. The boring head 50 includes sensors capable of sensing the torque at the rotary drive shaft 62. Thus, if the torque increases, which may indicate the presence of steel reinforcing rods in the cutting surface, the downward speed of the boring head 50 can be reduced to prevent excessive wear to the hole saw 54.

After the cutting process is complete, the process is reversed. First, auto down feature is deactivated by rotating the auto down switch 80 to the "OFF" position. The drill up pushbutton 74 is depressed, which actuates the piston 58 in an upward direction thereby raising the boring head 50 and hence the hole saw 54 from the cutting surface. Once the hole saw 54 clears the cutting surface, the turbo pushbutton 78 may be used again to increase the travel rate of the boring head 50, as described above. The water system may be deactivated via the water pushbutton 92 any time after the hole saw 54 clears the cutting surface. The leveling feet 40 are raised via the feet up pushbutton 86 and the vacuum system is deactivated via the vacuum pump pushbutton 94 thereby releasing the boring machine 10 from the cutting surface and the support frame 42 and support plate 43 are raised such that the vacuum pad 36 is no longer in contact with the cutting surface. Finally, the emergency stop pushbutton 96 is depressed to a pushed in position to allow the operator to transport the boring machine 10 to another drilling location.

Figure 7:
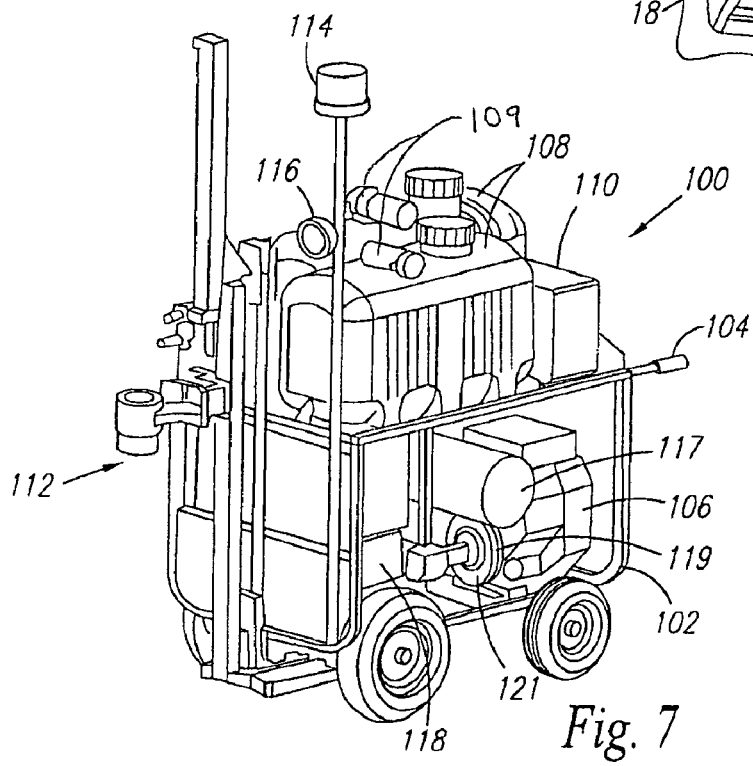
FIG. 7 is a perspective view of a second embodiment of the concrete boring machine.

Referring to FIG. 7, FIG. 7 shows a perspective view of a second embodiment of the boring machine 100. The second embodiment shown in FIG. 7 operates essentially the same as the first embodiment shown in FIGS. 1-6 but has a different configuration. The second embodiment includes a frame 102 with a pair of handles 104, an engine 106 and a generator 118 mounted within the frame 102, two water tanks 108, water pumps 109 and a fuel tank 110 mounted on top of the frame 102. Consistent with the previous embodiment, the second embodiment has the generator 118 powered by the engine 106 using a polychain 119 attached to a pulley 121 mounted on the engine's power output shaft. The engine 106 preferably comprises a gasoline engine and it may include a catalytic converter 117 to allow operation indoors. The water tanks 108 and fuel tank 110 are made from a suitable material known in the art such as plastic. In the first embodiment shown in FIGS. 1-6 the water tank and fuel tank were made from steel. The boring machine also includes a hydraulic boring sub-assembly 112 with a hydraulic fluid system, a vacuum system and a water cooling system similar to the first embodiment shown in FIGS. 1-6. The boring machine 100 may also include additional electrical outlets and auxiliary hydraulic connections as compared to the first embodiment. The control system is similar to the control system in the first embodiment but may include toggle switches and/or pushbuttons. The control system may also include a toggle switch to switch the hydraulic fluid system between providing power to the engine to drive the wheels, providing power to the hole saw and providing auxiliary power for the use of hand tools. The boring machine also includes a strobe light 114 and a spot light 116 for safety purposes. The control system may also include a tachometer to monitor the speed of the hole saw during the cutting process.

It should be noted that the portable boring machine also includes additional features not shown in the drawings. One such feature includes a storage area located within the enclosed frame for storing of hand tools and other items. Another feature includes an auxiliary hydraulic circuit that includes a hydraulic quick coupling device for attaching auxiliary hydraulic equipment such as a core drill, chain saw, cutoff saw, etc.

While specific embodiments of the invention have been described and illustrated, it is to be understood that these embodiments are provided by way of example only and that the invention is not to be construed as being limited but only by proper scope of the following claims.

What is claimed is:

1. A portable boring machine for cutting holes in a cutting surface comprising:
   a frame having a pair of handles horizontally spaced apart and horizontally extending outward from an upper-rear portion of the frame;
   a vacuum system to secure a front end of the portable machine to the cutting surface;
   a hydraulic boring sub-assembly operatively attached to the front end of the frame, the hydraulic boring system having a boring head, and a hole saw operatively attached to the boring head via a rotary drive shaft;
   a water cooling/lubrication system to provide cooling and/or lubrication to the hole saw;
   multiple power driven wheels operatively attached to a bottom of the frame; and
   an engine mounted within the frame to power to the multiple power-driven wheels,
   wherein an operator activates the engine with a drive actuator located on an upper-rear portion of the frame between the handles, and
   wherein the operator grasps the handles and walks behind the portable boring machine to transport the portable boring machine to different cutting locations.

2. The portable boring machine of claim 1, wherein the water cooling/lubrication system includes a water tank, a water pump, a connection valve, and a water hose connecting the water tank to the connection valve, wherein the connection valve is operatively connected to the boring head such that the connection valve is in line with the rotary drive shaft, and wherein water from the water tank flows through the water hose, through the connection valve and down the rotary drive shaft to the hole saw.

3. The portable boring machine of claim 2, wherein the vacuum system includes a vacuum pump, a vacuum pad and a vacuum hose to connect the vacuum pump to the vacuum pad, wherein the vacuum pad is located on an underside of a support plate, and wherein the vacuum pump draws a vacuum impulse at the vacuum pad to secure the front end of the boring machine to the cutting surface.

4. The portable boring machine of claim 3 further comprising multiple leveling feet operatively attached to a bottom-rear portion of the frame, wherein the multiple leveling feet are lowered to contact the cutting surface after the front end of the boring machine is secured to the cutting surface to thereby level the boring machine.

5. The portable boring machine of claim 4, wherein the hydraulic boring sub-assembly further comprises a hydraulic cylinder having a piston and a variable speed-hydraulic transmission, wherein a distal end of the piston is operatively attached to the boring head, wherein the piston, when actuated, moves the boring head and the hole saw in a vertical direction, and wherein the variable speed-hydraulic transmission, which is operatively attached to a top portion of the boring head, operates the rotary drive shaft.

6. The portable boring machine of claim 5, wherein the hydraulic boring sub-assembly further includes a support frame slidably attached to the front end of the frame and an elongated gear track extending in a vertical direction along a side of the support frame, and wherein the boring head travels along the elongated gear track via a carrier.

7. The portable boring machine of claim 1, wherein the hydraulic boring sub-assembly further comprises a hydraulic cylinder having a piston, a variable speed-hydraulic transmission, a support frame slidably attached to a front portion of the frame, and an elongated gear track extending vertically along a side of the support frame, wherein a distal end of the piston is operatively attached to the boring head, wherein the piston, when actuated, moves the boring head in a vertical direction along the elongated gear track, and wherein the variable speed-hydraulic transmission, which is operatively attached to a top portion of the boring head, operates the rotary drive shaft.

8. The portable boring machine of claim 1, further comprising a control system, wherein the control system includes a turbo feature and wherein the turbo feature, when actuated simultaneously with the piston, increases the travel rate of the boring head along the elongated gear track.

9. The portable boring machine of claim 1, further comprising a generator to provide power to the vacuum system, the generator having electrical outlets to provide auxiliary power to power operated hand held tools.

10. A portable boring machine for cutting holes in a cutting surface comprising:
- a frame having a pair of handles horizontally spaced apart and horizontally extending outward from an upper-rear portion of the frame;
- a vacuum system to secure a front end of the portable machine to the cutting surface, the vacuum system including a vacuum pump, a vacuum pad and a vacuum hose to connect the vacuum pump to the vacuum pad, wherein the vacuum pad is located on an underside of a support plate, and wherein the vacuum pump draws a vacuum impulse at the vacuum pad to secure the front end of the boring machine to the cutting surface;
- a hydraulic boring sub-assembly operatively attached to the front end of the frame, the hydraulic boring system having a boring head, and a hole saw operatively attached to the boring head via a rotary drive shaft;
  - wherein the hydraulic boring sub-assembly further comprises a hydraulic cylinder having a piston and a variable speed-hydraulic transmission, wherein a distal end of the piston is operatively attached to the boring head, wherein the piston, when actuated, moves the boring head and the hole saw in a vertical direction, and wherein the variable speed-hydraulic transmission, which is operatively attached to a top portion of the boring head, operates the rotary drive shaft and
  - wherein the hydraulic boring sub-assembly further includes a support frame slidably attached to the front end of the frame and an elongated gear track extending in a vertical direction along a side of the support frame, and wherein the boring head travels along the elongated gear track via a carrier
- a water cooling/lubrication system to provide cooling and/or lubrication to the hole saw;
  - wherein the water cooling/lubrication system including a water tank, a water pump, a connection valve, and a water hose connecting the water tank to the connection valve, wherein the connection valve is operatively connected to the boring head such that the connection valve is in line with the rotary drive shaft, and wherein water from the water tank flows through the water hose, through the connection valve and down the rotary drive shaft to the hole saw;
- multiple power driven wheels operatively attached to a bottom of the frame;
- an engine mounted within the frame to power to the multiple power-driven wheels,
- multiple leveling feet operatively attached to a bottom-rear portion of the frame, wherein the multiple leveling feet are lowered to contact the cutting surface after the front end of the boring machine is secured to the cutting surface to thereby level the boring machine, and
- a generator to provide power to the vacuum system, the generator having electrical outlets to provide auxiliary power to power operated hand held tools,
- wherein an operator activates the engine with a drive actuator located on an upper-rear portion of the frame between the handles, and
- wherein the operator grasps the handles and walks behind the portable boring machine to transport the portable boring machine to different cutting locations.

11. A portable boring machine for cutting holes in a cutting surface comprising:
- a frame having a pair of handles horizontally spaced apart and horizontally extending outward from an upper-rear portion of the frame;
- a vacuum system to secure a front end of the portable machine to the cutting surface;
- a hydraulic boring sub-assembly operatively attached to the front end of the frame, the hydraulic boring system having a boring head, and a hole saw operatively attached to the boring head via a rotary drive shaft, wherein the hydraulic boring sub-assembly further comprises a hydraulic cylinder having a piston, a variable speed-hydraulic transmission, a support frame slidably attached to a front portion of the frame, and an elongated gear track extending vertically along a side of the support frame, wherein a distal end of the piston is operatively attached to the boring head, wherein the piston, when actuated, moves the boring head in a vertical direction along the elongated gear track, and wherein the variable speed-hydraulic transmission, which is operatively attached to a top portion of the boring head, operates the rotary drive shaft a water cooling/lubrication system to provide cooling and/or lubrication to the hole saw;

multiple power driven wheels operatively attached to a bottom of the frame; and an engine mounted within the frame to power to the multiple power-driven wheels, a control system, wherein the control system includes a turbo feature and wherein the turbo feature, when actuated simultaneously with the piston, increases the travel rate of the boring head along the elongated gear track;

wherein an operator activates the engine with a drive actuator located on an upper-rear portion of the frame between the handles; and wherein the operator grasps the handles and walks behind the portable boring machine to transport the portable boring machine to different cutting locations.

12. The portable boring machine of claim 11, wherein the control system further includes an auto down feature and wherein the auto down feature maintains the downward motion of the piston during a cutting process.

13. The portable boring machine of claim 12, wherein during the cutting process, the control system senses the torque exerted by the rotary drive shaft via the boring head and wherein as the torque increases the downward speed of the piston decreases to reduce excess wear to the hole saw.

14. A method of operating a portable boring machine comprising the steps of:
providing the portable boring machine with a frame having a pair of handles horizontally spaced apart and horizontally extending outward away from an upper-rear portion of the frame, multiple power driven wheels operatively attached to a bottom portion of the frame, an engine mounted within the frame to drive the multiple power driven wheels, and a hole saw operatively attached to a front end of the portable boring machine;
actuating a vacuum system to secure a front end of the portable boring machine to a cutting surface;
lowering multiple leveling feet on a rear-bottom portion of a frame to level the portable boring machine;
lowering the hole saw via a hydraulic boring sub-assembly;
actuating the hole saw to cut a hole in the cutting surface;
raising the hole saw via the hydraulic boring sub-assembly;
actuating the multiple power driven wheels via the engine;
grasping the handles; and
walking behind the portable boring machine to transport the portable boring machine to a different cutting location.

15. The method of claim 14, wherein prior to the step of raising the hole saw the method further comprises the step of actuating a water pump to provide water to the hole saw for cooling and/or lubrication purposes.

16. The method of claim 14, wherein the step of lowering the hole saw further comprises the step of actuating a turbo feature to increase a vertical travel speed of the hole saw.

17. A method of operating a portable boring machine comprising the steps of:
providing the portable boring machine with a frame having a pair of handles horizontally spaced apart and horizontally extending outward away from an upper-rear portion of the frame, multiple power driven wheels operatively attached to a bottom portion of the frame, an engine mounted within the frame to drive the multiple power driven wheels, and a hole saw operatively attached to a front end of the portable boring machine;
actuating a vacuum system to secure a front end of the portable boring machine to a cutting surface;
lowering multiple leveling feet on a rear-bottom portion of a frame to level the portable boring machine;
lowering the hole saw via a hydraulic boring sub-assembly;
actuating a turbo feature to increase a vertical travel speed of the hole saw;
actuating the hole saw to cut a hole in the cutting surface;
actuating a water pump to provide water to the hole saw for cooling and/or lubrication purposes;
raising the hole saw via the hydraulic boring sub-assembly;
de-actuating the hole saw;
actuating the multiple power driven wheels via the engine;
grasping the handles; and
walking behind the portable boring machine to transport the portable boring machine to a different cutting location.

18. The method of claim 17, wherein actuating the hole saw to cut a hole in the cutting surface further comprises the steps of:
actuating an auto down feature to automatically maintain a downward motion of the hole saw during the cutting process; and
sensing a torque generated by the hole saw, wherein the downward speed of the hole saw is reduced if the torque increases.

19. The method of claim 18, wherein the step of actuating a vacuum system to secure a front end of the portable boring machine to a cutting surface further comprises the steps of:
lowering a vacuum pad to contact the cutting surface;
actuating a vacuum pump; and
drawing a vacuum impulse at the vacuum pad and the cutting surface to secure the front end of the portable boring machine to the cutting surface.

20. The method of claim 19, wherein the step of raising the hole saw further comprises the step of actuating the turbo feature to increase the vertical travel speed of the hole saw.

* * * * *